Nov. 17, 1970  C. T. BARTZ  3,541,443
STANDING WAVING SENSING FREQUENCY INDICATING DEVICE
Filed March 27, 1968  5 Sheets-Sheet 1

INVENTOR
CLIFFORD T. BARTZ
BY Jeffers and Young
ATTORNEYS

Nov. 17, 1970      C. T. BARTZ      3,541,443
STANDING WAVING SENSING FREQUENCY INDICATING DEVICE
Filed March 27, 1968      5 Sheets-Sheet 2
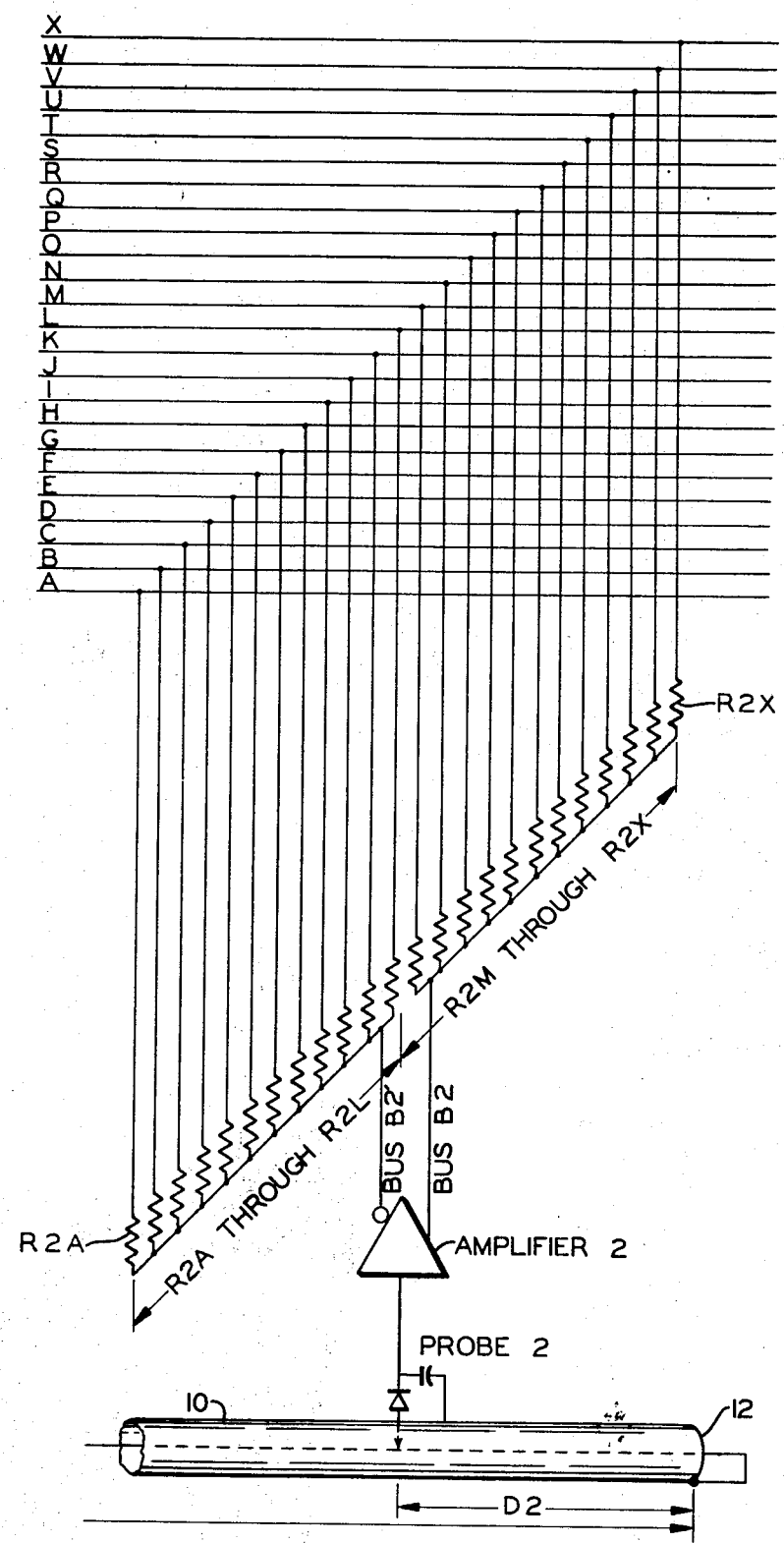
FIG.—1b
INVENTOR
CLIFFORD T. BARTZ
BY Jeffers and Young
ATTORNEYS Nov. 17, 1970     C. T. BARTZ     3,541,443
STANDING WAVING SENSING FREQUENCY INDICATING DEVICE
Filed March 27, 1968     5 Sheets-Sheet 3

INVENTOR
CLIFFORD T. BARTZ

BY Jeffers and Young
ATTORNEYS

Nov. 17, 1970

C. T. BARTZ

3,541,443

STANDING WAVING SENSING FREQUENCY INDICATING DEVICE

Filed March 27, 1968

INVENTOR
CLIFFORD T. BARTZ

BY *Jeffers and Young*
ATTORNEYS

United States Patent Office 3,541,443
Patented Nov. 17, 1970

1

3,541,443
STANDING WAVING SENSING FREQUENCY
INDICATING DEVICE
Clifford T. Bartz, Fort Wayne, Ind., assignor to The
Magnavox Company, Fort Wayne, Ind., a corporation
of Delaware
Filed Mar. 27, 1968, Ser. No. 716,559
Int. Cl. G01r 23/02
U.S. Cl. 324—78                                    6 Claims

ABSTRACT OF THE DISCLOSURE

The standing wave frequency of a signal is indicated by sensing, at a plurality of locations, the voltages of standing waves produced by the signal. The sensed standing wave voltages are applied to a resistor network which is designed so that different voltages are produced for each different signal frequency that is present. The different voltages are applied to logic elements which indicate the signal frequency that is present.

BACKGROUND OF THE INVENTION

My invention relates to a frequency indicating device, and particularly to a frequency indicating device that can rapidly indicate any one of several frequencies in a band of frequencies.

Indication of specific frequencies in a band of frequencies is becoming increasingly important. In commercial applications, information may be indicated by a specific freqency. In order that the information can be utilized, its frequency must be quickly indicated.

Accordingly, an object of my invention is to provide an improved frequency indicating device that rapidly indicates any one of several frequencies present in a band of frequencies.

Frequency indicating devices have been previously provided. One such device counts the pulses in a signal to indicate the frequency. Such counting may be difficult since the frequency to be indicated may be very high, in the order of thousands of megacycles. Therefore, such a device must be precise and may be complicated. A second device for indicating frequency applies the signal to a comb filter. The comb filter consists of a separate, tuned filter for each frequency to be indicated. If the number of frequencies is large, then the number of required tuned filters is also large. A third device for indicating frequency sweeps a local oscillator over a band of frequencies. The local oscillator signal is mixed with an incoming signal to produce a known beat frequency signal. If the frequency of the local oscillator signal is known at the time the beat frequency signal is produced, the frequency of the incoming signal can be determined. But if the incoming signal has a short time duration, the local oscillator may not sweep through the necessary part of the band of frequencies. In such a case, the beat frequency signal that indicates the incoming signal may not be produced, and the incoming signal may never be detected.

Accordingly, another object of my invention is to provide an improved frequency indicating device that can indicate a signal frequency that has a very short time duration.

Another object of my invention is to provide an improved frequency indicating device that has a relatively simple circuit, and a relatively small physical size.

Another object of my invention is to provide an improved frequency indicating device that can indicate any one frequency in a band of wave energy, particularly electromagnetic wave energy, at any time.

Another object of my invention is to provide an improved frequency indicating device that is relatively small

2 and compact, that is rapid in operation, and that detects and indicates any one signal frequency in a band even though the sigal has a very short time duration.

SUMMARY OF THE INVENTION

Briefly, these and other objects are achieved in accordance with my invention by a frequency indicating device that has a transmission line to which signals, whose frequencies are to be indicated, are supplied. The transmission line is provided with means for causing or producing standing waves in response to the applied signals. A plurality of probes are coupled to the transmission line for sensing these standing wave and producing respective voltages indicative of the sensed standing waves. The probes are positioned at respective distance from the means that cause the standing waves. An impedance network, such as a resistor network, is coupled to the probes for deriving voltages which respectively vary in magnitude with applied frequencies. These different voltages are applied to a logic circuit which senses the various voltages present and provides a different indication of each different frequency which is persent. My frequency indicating device is relatively simple and compact, operates rapidly to provide a frequency indication, and can sense and indicate any desired frequency increment over any desired band. Thus, my frequency indicating device eliminates many of the disadvantages of prior art frequency indicating devices.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

FIGS. 1a, 1b, 1c, and 1d show a schematic diagram of an embodiment of a frequency indicating device in accordance with my invention.

Figure 1A:
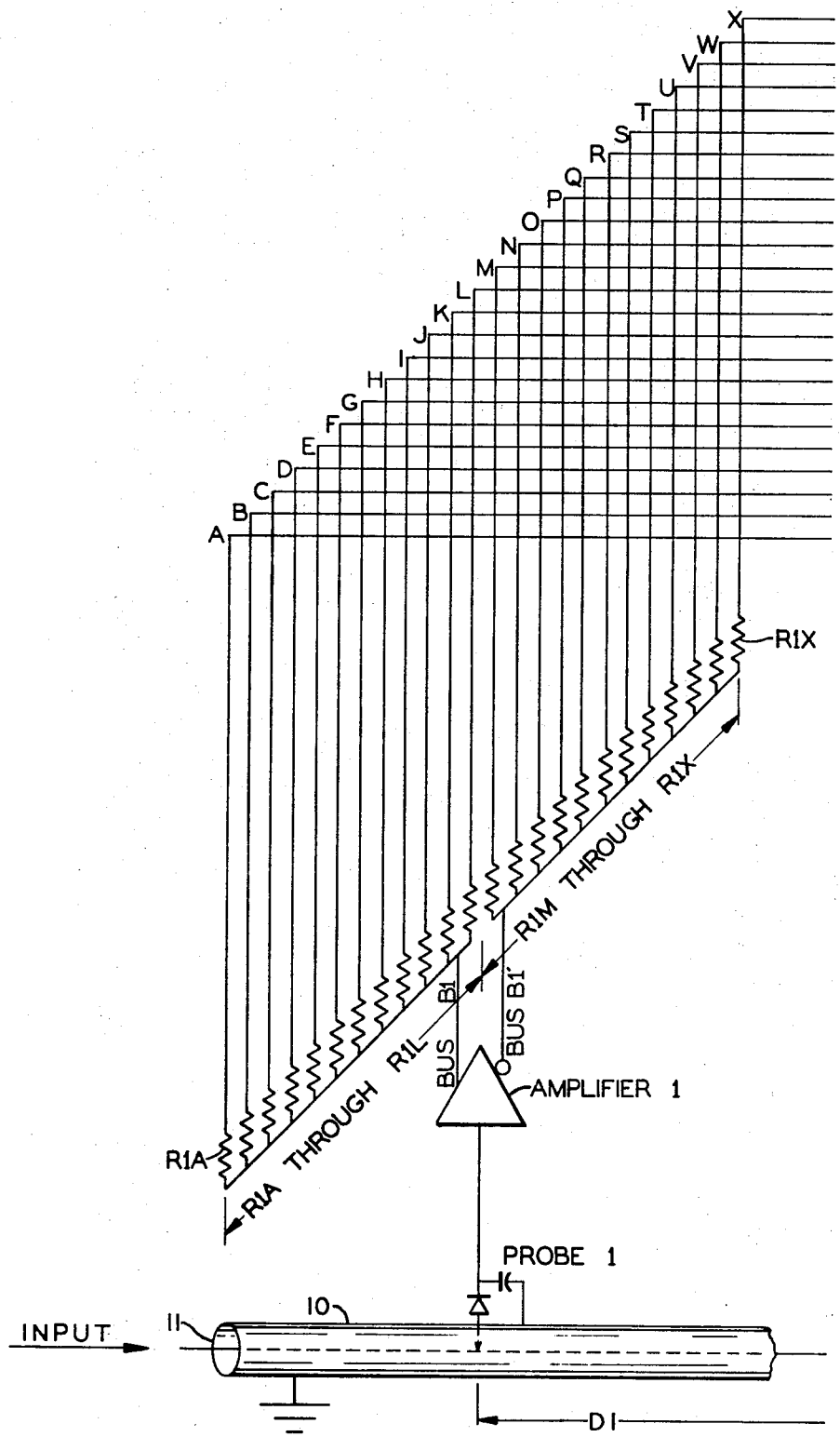
Figure 1C:
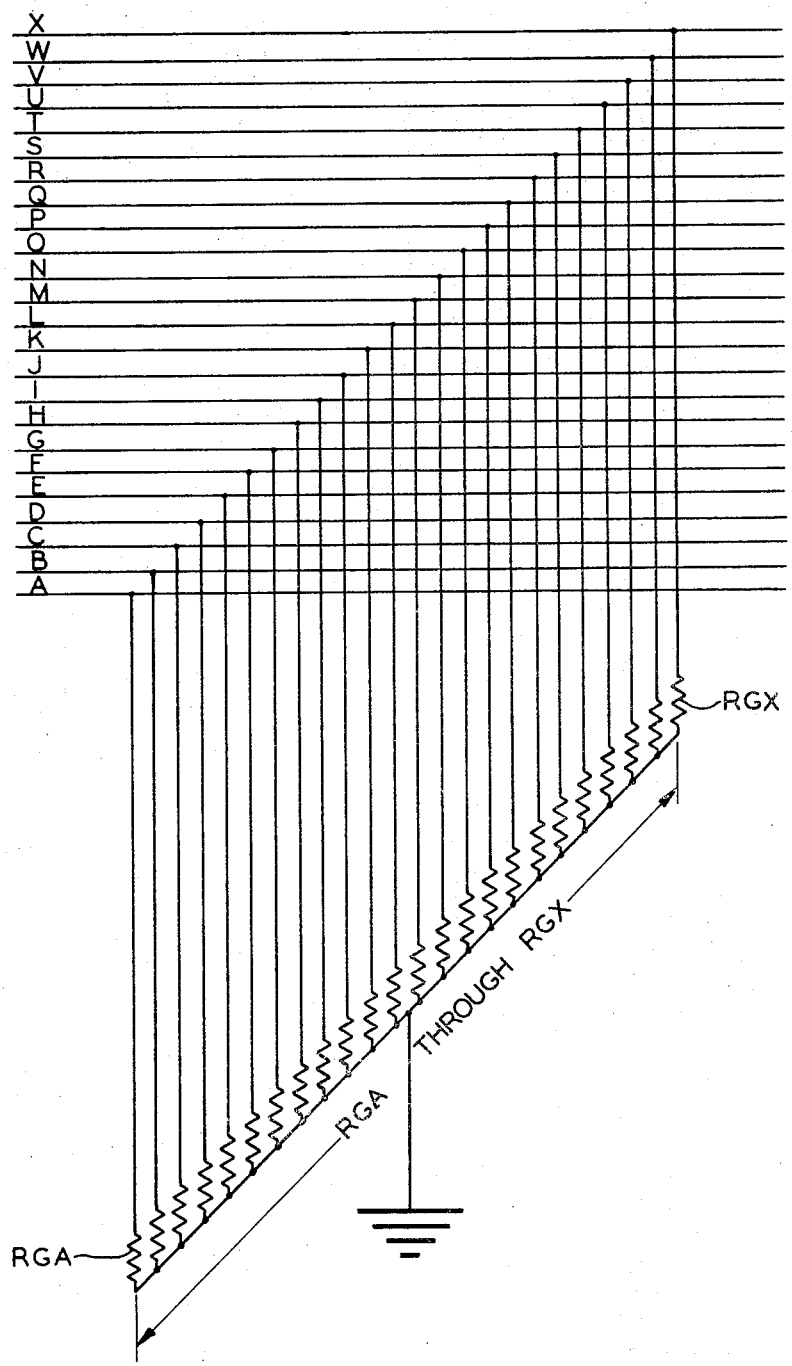
Figure 1D:
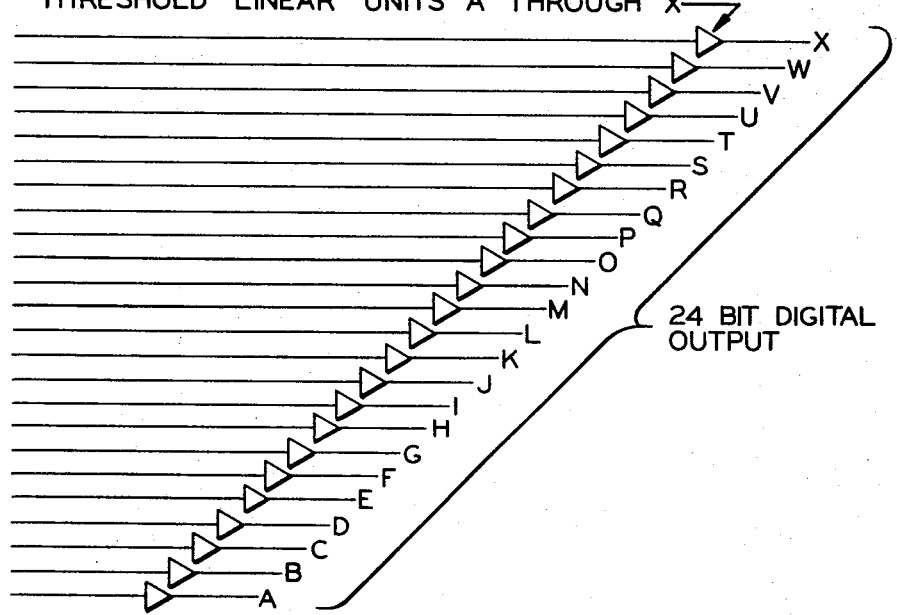

DESCRIPTION OF THE PREFERRED
EMBODIMENT

FIGS. 1a through 1d show a schematic diagram of one embodiment of my invention for electromagnetic waves. FIGS. 1a through 1d are to be considered as being connected together by correspondingly positioned leads, with FIG. 1a at the left, FIG. 1b to the right of FIG. 1a, FIG. 1c to the right of FIG. 1b, and FIG. 1d to the right of FIG. 1c. The following description is based on the figures so connected.

My frequency indicating device comprises a transmission line 10 which may be a coaxial transmission line as shown, or which may be a wave guide or other type of transmission line. In the embodiment shown in FIGS. 1a through 1d, it has been assumed that the frequency indicating device is to sense electromagnetic waves and indicate frequencies in one megacycle increments over a radio frequency band between 3,176 and 3,200 megacycles (mc.). The frequencies which are to be sensed and indicated are applied to an input end 11 of the transmission line 10. The other end 12 of the transmission line is arranged to produce standing waves. This may be provided by an impedance mismatch, such as a short circuit between the inner and outer conductors as shown. A probe 1 and a probe 2 are connected to the transmission line 10 at respective distances D1 and D2 from the short circuit at the end 12. These probes 1 and 2 may comprise any suitable device for sensing voltage within the transmission line 10. The probes 1 and 2 may comprise a conductor which is inserted within but insulated from the transmission line 10, or which is inserted within the transmission line 10 and connected to the inner conductor. For the band of frequencies between 3,176 and 3,200 megacycles, the distances (i.e., the electrical length) D1 and D2 with an air dielectric in the transmission line 10 are preferably 2.717 and 2.600 meters respectively. Each of the probes 1 and 2 is provided with an output rectifier device and a filter capacitor connected between the output of the rectifier device and the outer conductor of the transmission line 10. Other types of probes and output circuits may also be used.

The voltage outputs from the probes 1 and 2 are respectively applied to amplifiers 1 and 2 which are preferably similar, stable, high gain amplifiers, each having two equal and opposite (in polarity) voltage outputs. The outputs having the same polarity are supplied to respective buses B1 and B2, and the outputs having the opposite polarity are supplied to respective buses B1' and B2'. A network of twelve resistors R1A through R1L is coupled to the bus B1, and a network of twelve resistors R1M through R1X is coupled to the bus B1'. A network of twelve resistors R2A through R2L is coupled to the bus B2', and a network of twelve resistors R2M through R2X is coupled to the bus B2.

Twenty-four summing buses A through X are provided, and in the figures extend horizontally to interconnect the frequency indicating device. The resistors R1A through R1X and R2A through R2X are connected to the summing buses A through X, with each resistor having a given suffix letter being connected to the summing bus having the same letter. Thus, resistor R1A is connected to summing bus A, and resistor R2X is connected to summing bus X. It should be noted that the summing buses A through L are connected through resistors to one polarity of the amplifier 1 and to the opposite polarity of the amplifier 2, and that the summing buses M through X are connected through resistors to one polarity of the amplifier 2 and to the opposite polarity of the amplifier 1. These opposite polarities are used in order to provide a zero voltage reference about which threshold linear units operate. A zero voltage reference allows a more stable threshold linear unit. Each of the summing buses A through X is connected through one or more resistors to one or more points of reference potential. In the example, each summing bus is connected through a resistor to ground. The outer conductor of the transmission line 10 is usually connected to ground. The grounding resistors shown are respectively indicated as resistors RGA through RGX. Outputs from the summing buses A through X are respectively applied to threshold linear units A through X. These threshold linear units are constructed so as to convert the analog signals applied to their inputs to either a logic 1 or a logic 0. In the embodiment shown, the threshold linear units A through X are each designed to produce a logic 1 in response to an input which is greater than plus 3 millivolts, and to produce a logic 0 in response to an input which is less than, including negative values, plus 1 millivolt. The outputs of these threshold linear units A through X indicate the respective frequencies between 3,176 and 3,200 megacycles in one megacycle increments.

For the frequencies from 3,176 through 3,200 megacycles, the resistors of FIGS. 1a through 1d had the following values in ohms:

| | |
|---|---|
| R1A=8,870 | R2A=200,000 |
| R1B=13,000 | R2B=200,000 |
| R1C=18,700 | R2C=200,000 |
| R1D=26,100 | R2D=200,000 |
| R1E=35,700 | R2E=200,000 |
| R1F=46,400 | R2F=200,000 |
| R1G=60,400 | R2G=200,000 |
| R1H=76,800 | R2H=200,000 |
| R1I=95,300 | R2I=200,000 |
| R1J=118,000 | R2J=200,000 |
| R1K=147,000 | R2K=200,000 |
| R1L=182,000 | R2L=200,000 |
| R1M=200,000 | R2M=191,000 |
| R1N=200,000 | R2N=154,000 |
| R1O=200,000 | R2O=124,000 |
| R1P=200,000 | R2P=100,000 |
| R1Q=200,000 | R2Q=80,600 |
| R1R=200,000 | R2R=63,400 |
| R1S=200,000 | R2S=49,900 |
| R1T=200,000 | R2T=38,300 |
| R1U=200,000 | R2U=29,400 |
| R1V=200,000 | R2V=21,500 |
| R1W=200,000 | R2W=15,800 |
| R1X=200,000 | R2X=11,000 |

The resistors RGA through RGX all had a value of 2,000 ohms to keep the input circuits of the threshold linear units close to ground potential. With these values of resistors, the following table illustrates the logic outputs of the threshold linear units A through X for the respective frequencies from 3,176 through 3,200 megacycles:

| Frequency, mc. | Output: threshold linear unit | | | | | | | | | | | | | | | | | | | | | | | |
|---|---|---|---|---|---|---|---|---|---|---|---|---|---|---|---|---|---|---|---|---|---|---|---|---|
| | A | B | C | D | E | F | G | H | I | J | K | L | M | N | O | P | Q | R | S | T | U | V | W | X |
| 3,176 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 |
| 3,177 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 0 |
| 3,178 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 0 | 0 |
| 3,179 | 0 | 0 | 0 | 0 | 0 | 0 | 0 | 0 | 0 | 0 | 0 | 0 | 1 | 1 | 1 | 1 | 1 | 1 | 1 | 1 | 1 | 0 | 0 | 0 |
| 3,180 | 0 | 0 | 0 | 0 | 0 | 0 | 0 | 0 | 0 | 0 | 0 | 0 | 1 | 1 | 1 | 1 | 1 | 1 | 1 | 1 | 0 | 0 | 0 | 0 |
| 3,181 | 0 | 0 | 0 | 0 | 0 | 0 | 0 | 0 | 0 | 0 | 0 | 0 | 1 | 1 | 1 | 1 | 1 | 1 | 1 | 0 | 0 | 0 | 0 | 0 |
| 3,182 | 0 | 0 | 0 | 0 | 0 | 0 | 0 | 0 | 0 | 0 | 0 | 0 | 1 | 1 | 1 | 1 | 1 | 1 | 0 | 0 | 0 | 0 | 0 | 0 |
| 3,183 | 0 | 0 | 0 | 0 | 0 | 0 | 0 | 0 | 0 | 0 | 0 | 0 | 1 | 1 | 1 | 1 | 1 | 0 | 0 | 0 | 0 | 0 | 0 | 0 |
| 3,184 | 0 | 0 | 0 | 0 | 0 | 0 | 0 | 0 | 0 | 0 | 0 | 0 | 1 | 1 | 1 | 1 | 0 | 0 | 0 | 0 | 0 | 0 | 0 | 0 |
| 3,185 | 0 | 0 | 0 | 0 | 0 | 0 | 0 | 0 | 0 | 0 | 0 | 0 | 1 | 1 | 1 | 0 | 0 | 0 | 0 | 0 | 0 | 0 | 0 | 0 |
| 3,186 | 0 | 0 | 0 | 0 | 0 | 0 | 0 | 0 | 0 | 0 | 0 | 0 | 1 | 1 | 0 | 0 | 0 | 0 | 0 | 0 | 0 | 0 | 0 | 0 |
| 3,187 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 |
| 3,188 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 3,189 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 |
| 3,190 | 0 | 0 | 0 | 0 | 0 | 0 | 0 | 0 | 0 | 0 | 1 | 1 | 0 | 0 | 0 | 0 | 0 | 0 | 0 | 0 | 0 | 0 | 0 | 0 |
| 3,191 | 0 | 0 | 0 | 0 | 0 | 0 | 0 | 0 | 0 | 1 | 1 | 1 | 0 | 0 | 0 | 0 | 0 | 0 | 0 | 0 | 0 | 0 | 0 | 0 |
| 3,192 | 0 | 0 | 0 | 0 | 0 | 0 | 0 | 0 | 1 | 1 | 1 | 1 | 0 | 0 | 0 | 0 | 0 | 0 | 0 | 0 | 0 | 0 | 0 | 0 |
| 3,193 | 0 | 0 | 0 | 0 | 0 | 0 | 0 | 1 | 1 | 1 | 1 | 1 | 0 | 0 | 0 | 0 | 0 | 0 | 0 | 0 | 0 | 0 | 0 | 0 |
| 3,194 | 0 | 0 | 0 | 0 | 0 | 0 | 1 | 1 | 1 | 1 | 1 | 1 | 0 | 0 | 0 | 0 | 0 | 0 | 0 | 0 | 0 | 0 | 0 | 0 |
| 3,195 | 0 | 0 | 0 | 0 | 0 | 1 | 1 | 1 | 1 | 1 | 1 | 1 | 0 | 0 | 0 | 0 | 0 | 0 | 0 | 0 | 0 | 0 | 0 | 0 |
| 3,196 | 0 | 0 | 0 | 0 | 1 | 1 | 1 | 1 | 1 | 1 | 1 | 1 | 0 | 0 | 0 | 0 | 0 | 0 | 0 | 0 | 0 | 0 | 0 | 0 |
| 3,197 | 0 | 0 | 0 | 1 | 1 | 1 | 1 | 1 | 1 | 1 | 1 | 1 | 0 | 0 | 0 | 0 | 0 | 0 | 0 | 0 | 0 | 0 | 0 | 0 |
| 3,198 | 0 | 0 | 1 | 1 | 1 | 1 | 1 | 1 | 1 | 1 | 1 | 1 | 0 | 0 | 0 | 0 | 0 | 0 | 0 | 0 | 0 | 0 | 0 | 0 |
| 3,199 | 0 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 |
| 3,200 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 |

Thus, each frequency is indicated by a particular digital code. For example, at the frequency of 3,176 megacycles, the outputs of the threshold linear units A through L are a logic 0, and the outputs of the threshold linear units M through X are a logic 1. At the frequency of 3,177 megacycles, the outputs of the threshold linear units A through L and X are a logic 0, and the outputs of the threshold linear units M through W are a logic 1. Other different logic combinations are produced for each of the other frequencies. Other logic circuits can be coupled to the outputs of the threshold linear units.

It will thus be seen that my invention senses incoming frequencies over a band and rapidly produces an output indicative of the particular frequency applied. If two or more frequencies may be simultaneously received, then additional circuits are provided to eliminate errors and ambiguities. However, such circuits have not been discussed in order to keep the explanation relatively simple.

Figure 2:
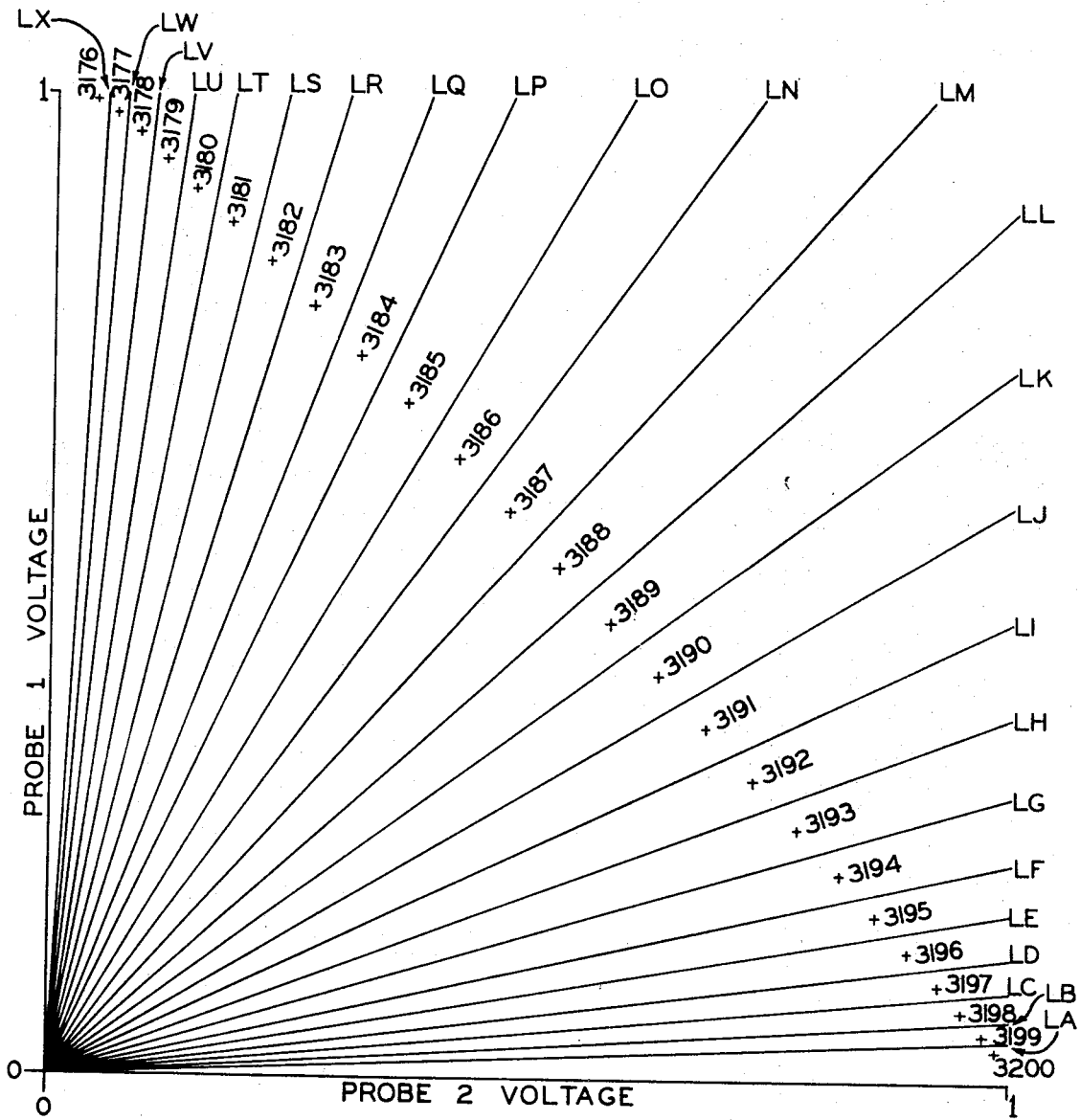
FIG. 2 shows a graph which is used in the design of my frequency indicating device.

In order that persons skilled in the art can utilize my invention for other bands and increments of frequencies, the design procedure for determining the values of resistors R1A through R1X and R2A through R2X is provided. This design is made by developing what is known as a pattern plane, as shown in the graph of FIG. 2. In FIG. 2, the voltages produced by the respective probes 1 and 2 have been normalized, so that the maximum voltage is never greater than 1. These voltages have been plotted relative to the vertical and horizontal axes respectively, for each of the indicated frequencies between 3,176 and 3,200 megacycles. (FIG. 2 should be used for illustration only, since the voltage points may not be plotted in precisely the correct places.) For each plotted frequency, the voltage of probe 1 is indicated by a short horizontal line, and the voltage of probe 2 is indicated by a short vertical line. In FIG. 2, it will be noted that the plotted voltages are generally symmetrical above and below the center frequency of 3,188 megacycles, and lie on an approximate straight line between the lower and upper frequencies. The position of these plotted voltages is determined by the probe distances D1 and D2 from the end 12 of the line 10. These distances D1 and D2 are determined by trial and error. In making this spacing determination, the probes are adjusted until the voltage points for each frequency are spaced as far apart as possible. After the voltage plot is obtained, lines are then drawn between each adjacent pair of the voltage points, these lines being indicated by the letter L followed by a letter. The slope of each individual line determines the ratio between each pair of individual resistors R1 and R2 having the same suffix letter. Thus, for example, the slope of the line LA represents the ratio of the resistor R1A to R2A. It will be seen that this slope is relatively small, so that the ratio of the resistor R1A to the resistor R2A is likewise relatively small. The other resistors were calculated accordingly. The resistors were also designed so that at each specified frequency, the voltage inputs to the threshold linear units were either below plus 1 millivolt or above plus 3 milivolts, so that determinative outputs are produced by the threshold linear units.

When the resistors were inserted in the network, their values had to be adjusted slightly in some instances. The probe distances D1 and D2 also had to be adjusted slightly. These adjustments were believed to be necessary because, among other reasons, the actual electrical characteristics of the transmission line 10, of the short circuit, and of the probes 1 and 2 were different from the theoretical electrical characteristics on which the various calculations were based.

It will thus be seen that my invention provides a new and improved device for indicating the frequency of signals. My device is relatively simple, and utilizes standard devices and components, such as resistors, amplifiers, and threshold linear units. My frequency indicating device provides a rapid indication of a frequency in a band of frequencies. Further, the indication does not require a long duration of the signal being measured. While I have shown my device in a specific embodiment for sensing and indicating radio frequencies in the electromagnetic spectrum, my device can sense and indicate frequencies of other types of energy, such as acoustic, magnetic, or light wave energy. Also, while I have shown my device used for indicating radio frequencies between 3,176 and 3,200 megacycles in one megacycle increments, other bands and other frequency increments may be provided. Likewise, additional probes may be provided if the band of frequencies must be greater, or if the frequency increments must be smaller. Other types of transmission lines and probes may also be utilized. Other types of devices may be used instead of amplifiers. Other types of devices may be used in place of the threshold linear units, or other threshold levels may be set for the threshold linear units. The lines shown in FIG. 2 may be drawn so that they do not pass through the origin. In this case, bias voltages and resistors would be connected to each of the summing buses in addition to grounding resistors RGA through RGX. Therefore, while I have shown my invention with reference to a particular embodiment, it is to be understood that modifications may be made without departing from the spirit of the invention or from the scope of the claims.

What I claim as new and desire to secure by Letters Patent of the United States is:

1. An improved frequency indicating device for indicating different radio frequencies in a band of frequencies comprising:
   (a) a transmission line having an input end and an impedance mismatch spaced from said input end for causing standing waves to be produced on said transmission line in response to radio frequency signals applied to said input end;
   (b) first voltage sensing means coupled to said transmission line between input end and said impedance mismatch for sensing said standing waves;
   (c) second voltage sensing means coupled to said transmission line between said first voltage sensing means and said impedance mismatch for sensing said standing waves;
   (d) a plurality of summing buses;
   (e) first and second impedances respectively coupling each of said summing buses to said first and second voltage sensing means;
   (f) said first and second impedances for each of said summing buses having a selected ratio;
   (g) and means coupled to each of said summing buses and responsive to predetermined voltages thereon for indicating a predetermined frequency.

2. The improved frequency indicating device of claim 1 and further comprising an impedance coupled between each of said summing buses and a point of reference potential.

3. The improved frequency indicating device of claim 1 and further comprising a plurality of impedances coupled between each of said summing buses and a plurality of points of reference potential.

4. The improved frequency indicating device of claim 1 wherein said means coupled to said summing buses comprise threshold linear units.

5. The improved frequency indicating device of claim 4 and further comprising an impedance coupled between each of said summing buses and a point of reference potential.

6. The improved frequency indicating device of claim 4 and further comprising a plurality of impedances coupled between each of said summing buses and a plurality of points of reference potential.

References Cited

UNITED STATES PATENTS 3,113,315 12/1963 Preikschat _____ 324—84 X
3,189,820 6/1965 Lowman _____ 324—82

FOREIGN PATENTS 920,585 3/1963 Great Britain.

ALFRED E. SMITH, Primary Examiner